United States Patent

Hartling et al.

[11] Patent Number: 5,842,723
[45] Date of Patent: Dec. 1, 1998

[54] FLEXIBLE CONNECTION ARRANGEMENT FOR CONNECTING A PIPE OF AN EXHAUST SYSTEM TO AN ENGINE, ESPECIALLY IN A MOTOR VEHICLE

[75] Inventors: Peter Hartling, Geretsried; Hans Deinhard, Kirchheim; Werner Friess, Munich, all of Germany

[73] Assignee: BUREX Automotive America, Inc., Houston, Tex.

[21] Appl. No.: 753,370

[22] Filed: Nov. 25, 1996

[51] Int. Cl.$^6$ .............................. F16L 55/00; F16L 29/05
[52] U.S. Cl. .............................. 285/49; 285/53; 285/226; 285/288.1
[58] Field of Search .............................. 285/49, 226, 227, 285/41, 288.1, 288.8, 47, 50, 53, 114

[56] References Cited

U.S. PATENT DOCUMENTS

| | | | |
|---|---|---|---|
| 3,770,303 | 11/1973 | Hallett | 285/226 X |
| 5,437,479 | 8/1995 | Hartling et al. | 285/49 |
| 5,480,194 | 1/1996 | Mantoan et al. | 285/226 X |
| 5,511,828 | 4/1996 | Kurek et al. | 285/49 |

*Primary Examiner*—Terry Lee Melius
*Assistant Examiner*—Heather Shackelford
*Attorney, Agent, or Firm*—McAulay Nissen Goldberg Kiel & Hand, LLP

[57] ABSTRACT

A flexible connection arrangement for connecting a pipe of an exhaust system to an engine is provided at one of its axial ends with a fastening flange and at its other axial end with a connection piece for the end of the pipe to be received. The connection piece and fastening flange are connected with one another via a helical spring. A metallic bellows and a damping insert which extends coaxially to the bellows, encloses the bellows radially externally and contacts the turns of the bellows are provided between the connection piece and the fastening flange. The helical spring is connected at both of its axial end regions with the connection piece and fastening flange, respectively. The connection at the fastening flange is effected via two fastening locations, one of which lies at that end of the helical spring, while the second fastening location is arranged so as to be offset to the first fastening location by an angle of 45° to 53°. The first fastening location viewed in the winding direction of the helical spring lies at an angle in the range of 10° to 20° in front of a radial tilt axis running vertical to the longitudinal axis of the connection arrangement, the connection arrangement being tilted about this tilt axis when used in the prescribed manner.

18 Claims, 2 Drawing Sheets

FLEXIBLE CONNECTION ARRANGEMENT FOR CONNECTING A PIPE OF AN EXHAUST SYSTEM TO AN ENGINE, ESPECIALLY IN A MOTOR VEHICLE

BACKGROUND OF THE INVENTION a) Field of the Invention

The invention is directed to a flexible connection arrangement for connecting a pipe of an exhaust system, especially in a motor vehicle, to an engine.

Such flexible connection arrangements are used in exhaust lines, especially in motor vehicles, in the form of intermediate pieces and serve to connect the exhaust pipe with the engine in a springing, articulated and damped manner and to decouple the two elements from one another with respect to vibrations as far as possible, i.e., to decouple oscillations and vibrations from the various structural component parts by enabling relative movements. Since the exhaust lines are designed as relatively rigid systems, the question of a resilient or elastic decoupling from the oscillating engine is especially significant.

b) Description of the Related Art

A connection arrangement in which a flexible bellows is used to prevent the unwanted escape of exhaust gases at the connecting point is known from EP-A-0 432 436. The bellows is directly enclosed by a braided metal wire sleeve, both the bellows and the braided metal wire sleeve being pressed together by their ends within a cylindrical support ring and pressed together with the support ring, and the parts are connected by provisional fastening. In addition, at least one flexible damping member which proceeds from a connection end of the connection arrangement and is movable relative to the braided sleeve is provided for good absorption of the oscillations and vibrations occurring in operation and brings about the desired damping effect by frictional contact at the braided sleeve surrounding the bellows. This flexible damping member can be constructed, for instance, in the form of a spring (e.g., a helical spring) which can be displaced on the braided sleeve so as to rub against the latter and is fastened by one end to one connection end of the connection arrangement, but is attached by its other end to the braided sleeve so as to be freely displaceable. This known connection arrangement has a complicated construction since the braided sleeve must be pressed together tightly and securely at both axial ends with the respective ends of the bellows and with the support ring. In addition, the braided sleeve must also completely absorb all axial forces, leading to the risk of a tearing of its end connection points or even of the braided sleeve itself. In addition, such braided metal sleeves can only stretch to a very limited degree and are easily frayed. They are also difficult to mount which is especially relevant with respect to the rubbing contact of the damping spring on the braided sleeve.

In another flexible connection arrangement which is described in EP-A-0 282 689, the bellows and the damping insert are arranged coaxially to one another, the radially inwardly directed end regions of the pleats in the bellows being embedded in the damping insert over a determined penetration depth. The working connection which is achieved in this way between the damping insert and the turns of the bellows results in a very efficient damping of oscillations and a uniform distribution of oscillations over the entire length of the bellows. In addition, the damping insert acts simultaneously as an insulating layer and as internal means for protecting the bellows against heat. For this purpose, the radial inner surface of the damping insert is formed by a flexible metal sleeve which is arranged coaxially thereto and welded on by both ends inside the inner circumference of one of the two pipe parts to be connected with one another. The bellows is enclosed on its outer side by a sleeve of braided metal for protection against external mechanical damage and soiling. The ends of the bellows are welded in the region of their outer diameter to the radially widening end portions of the connection pieces, the sleeve which encloses the bellows being included in this welding at the same time. This connection arrangement leads to a complete sealing of the connection point along with good acoustic insulation and thermal damping. However, its construction is very complicated and requires four circumferential welds, two of which serve to fasten the metal sleeve, bellows and connection piece simultaneously. Welds of precisely this kind can easily result in warping and welding stresses which affect both the bellows and the metal sleeve surrounding the latter and which, for example, build up compulsory stresses of precisely the kind that can also lead to malfunctions in the case of a sensitive metallic bellows. Because of the complicated construction of this known flexible connection arrangement, it is also relatively complicated and difficult to mount. Axial longitudinal forces must be completely absorbed by the inner metal sleeve or by the outer metal sleeve surrounding the bellows, which can cause cracking of welds or tearing of the respective metal sleeve in the event of large axial relative movements between the metal parts to be connected. Moreover, such flexible metal sleeves can stretch only to a very limited degree and fray easily.

A simpler construction, facilitated mounting and, at the same time, improved absorption of axial relative movements between the parts to be connected are achieved by the connection arrangement known from DE-C-42 33 644. In this reference the damping insert is so arranged that it encloses the bellows externally radially. The turns of the bellows contact the damping insert. The lateral end regions of the damping insert in the widened end portions of the connection pieces are received at the latter without fastening and are supported by these connection pieces externally radially. The connection pieces are connected with one another via a spring which is arranged externally on the damping insert. The heat protection is formed by a pipe portion extending coaxially to the bellows and inside the latter at a distance radially thereto.

The known connection arrangements mentioned above must be flexible but relatively stiff owing to their overall construction and to the helical springs which are used therein and which run externally around the circumference. In this respect, it must be ensured that the stresses occurring in the spring and in the structural component parts connected with the spring are limited as to magnitude such that the connection arrangement as a whole will have a sufficiently long lifetime under the occurring loads, e.g., in the form of an angular bending of the helical spring axis which extends in a straight line in the rest or neutral state.

OBJECT AND SUMMARY OF THE INVENTION

The primary object of the present invention is to provide a flexible connection arrangement for connecting a pipe of an exhaust system, especially that of a motor vehicle, to an engine, in which the stresses in the spring and accordingly also in the adjacent structural component parts are particularly low at a given deflection, resulting in a particularly long lifetime of the connection arrangement and resulting in a less rigid, i.e., more elastic, behavior of same in comparison to the known connection arrangements (resulting in smaller forces to be transmitted).

According to the invention, this object is met by a flexible connection arrangement for connecting a pipe of an exhaust system to an engine, especially of an exhaust system in a motor vehicle, having a fastening flange provided at one of its axial ends for fastening to the engine and a connection piece arranged at its other axial end for receiving one end of the pipe to be connected. The connection piece and the fastening flange are connected with one another via a helical spring. A metallic bellows is arranged between the connection piece and fastening flange radially inside the helical spring, this bellows being connected by its axial ends with the fastening flange and connection piece, respectively, in a gastight manner. Further, the connection arrangement is provided with a damping insert which extends coaxially to the bellows and is in a working connection with it. The damping insert encloses the bellows radially externally, contacts the turns of the bellows and, proceeding from the fastening flange, projects axially into an end region of the connection piece which widens radially on the side of the connection piece facing the damping insert, the axial ends of this damping insert being connected neither to the fastening flange nor to the connection piece. Further, a pipe portion which is connected with the fastening flange, extends coaxial to the bellows, and is arranged at a radial distance from the bellows within the same and extends at least over a partial region of the axial extension of the bellows is provided at the flexible connection arrangement, according to the invention, as heat protection for the bellows. The helical spring is connected at both axial end regions to the connection piece and to the fastening flange, respectively, and its connection with the fastening flange is effected via at least a first fastening location and a second fastening location located at a distance from the latter. The first fastening location is arranged at the end region of the helical spring and the second fastening location is arranged so as to be offset to the first fastening location by a first angle of 45° to 53° in the coiling or winding direction of the helical spring. The first fastening location, viewed in the winding direction of the helical spring, lies at a second angle in the range of 10° to 20° in front of a radially extending tilt axis running vertical to the axial longitudinal axis of the connection arrangement, the connection arrangement being tilted about this tilt axis during the introduction of occurring forces when used in the prescribed manner.

It was recognized in the flexible connection arrangement according to the invention that the stresses occurring in the spring depend to a very decisive extent on the relative rotational position of the spring in comparison to the plane of the introduction of force or to the tilt axis of the connection arrangement running vertical to this plane. The maximum stresses occurring at the fastening locations can be kept especially low in that the helical spring is arranged, according to the invention, in such a way that the helical spring on its side facing the fastening flange at its end portion is connected with the fastening flange via at least two fastening locations which are arranged at a distance from one another. One fastening location lies at the end of the spring and the other fastening location must be arranged in a determined angular position relative to the latter (viewed in the winding direction of the helical spring). The position of the first fastening location located at the end region of the helical spring relative to the aforementioned tilt axis of the overall arrangement (or relative to the position of the force introduction plane) lies in the required orientation according to the invention. The connection arrangement according to the invention is accordingly more elastic, i.e., less stiff, compared with the known connection arrangements. The deformation of this connection arrangement associated with one instance of loading results in the formation of particularly small stresses at the fastening locations (and accordingly also in the spring itself). As a result, only smaller forces need be transmitted between the structural component parts so that the lifetime of the connection arrangement is also increased. Due to the smaller maximum stresses, the helical spring can also be designed so as to be somewhat smaller than in conventional connection arrangements, which not only reduces weight but also decreases costs and leads to a more slender construction of the connection arrangement and accordingly even results in a reduction of the space required for installation.

In a particularly preferred manner, there are only two fastening locations between the helical spring and the fastening flange in the flexible connection arrangement according to the invention, although, if desired, one or two additional fastening locations could also be used between them. Manufacturing effort is also kept especially low and the construction is simplified as a whole when only the first and second fastening locations are used, as is preferred.

With respect to the fastening of the helical spring to the connection piece on the side located opposite the fastening flange in the connection arrangement according to the invention, two fastening locations can also preferably be used, which fastening locations can be arranged in accordance with the position of the two fastening locations on the side of the fastening flange. However, the helical spring is especially preferably connected with the connection piece via three fastening locations.

The fastening between the spring and connection piece and, respectively, the fastening flange can be effected at the fastening locations in any suitable form, e.g., by means of retaining plates engaging around the spring coil or by carrying out the fastening at all fastening locations in the form of spot welds. This has proven particularly advantageous. In this way, only short weld lengths are achieved, the damage to the spring material at the welding locations is comparatively minor and the spot welding technique can be carried out in a particularly precise, simple and fast manner.

With regard to the specific angular position of the helical spring in the connection arrangement according to the invention, the helical spring is arranged in a particularly preferred manner such that the second angle at which the first fastening location (at the end or end region of the helical spring) lies in front of the tilt axis in the rotational direction of the helical spring is 15° (or approximately 15°). Further, the first angle at which the second fastening location is arranged at an offset to the first fastening location viewed in the winding direction of the helical spring is selected at 50° (or approximately 50°).

Further, it is particularly advantageous in the connection arrangement according to the invention when the damping insert is axially displaceable within the widened end region of the connection piece so that the forces transmitted by the connection arrangement as a whole during a deflection can be kept particularly small. In an especially preferable manner a radial gap in the range of 0.5 mm to 0.8 mm is located between the outer side of the damping insert and the inner surface of the widened end region of the connection piece.

It is further preferable in the connection arrangement according to the invention that the turns of the helical spring are partially embedded slightly at their undersides in the surface of the damping insert so that a particularly good damping of the spring can be achieved.

The metallic bellows itself can be designed in any appropriate manner, but it is particularly preferably provided with helical or annular-wave turns.

Any material suitable for the desired damping and other side constraints can be used for the damping insert. However, the damping insert is particularly preferably formed of braided, woven or metal wire grate or of compressed metal wire. Good heat dissipation can be achieved especially with the use of a metal wire mesh. It may also be especially advisable in certain cases to add glass fibers or mineral fibers and/or a thermally insulating layer to the damping insert or to construct the damping insert itself from a material which damps and insulates against heat simultaneously so that when it is used in exhaust systems provided with catalytic converters the light-off time of the catalytic converter can be decreased.

Depending on the projected use, the helical springs in the flexible connection arrangement according to the invention can be formed of a suitable spring material of appropriate diameter. However, the helical spring is preferably fashioned from spring-steel wire, preferably with a diameter of 7.5 mm.

Further, in a particularly advantageous manner, the damping insert is designed so as to be permeable to air in the radial direction so that an especially good protection against overheating of the bellows can be achieved. In this case, the material used for the damping insert is provided with corresponding mesh sizes or air openings or pores.

BRIEF DESCRIPTION OF THE DRAWINGS

In the following, the invention will be explained in principle more fully by way of example with reference to the drawings.

DESCRIPTION OF THE PREFERRED EMBODIMENTS

Figure 1:
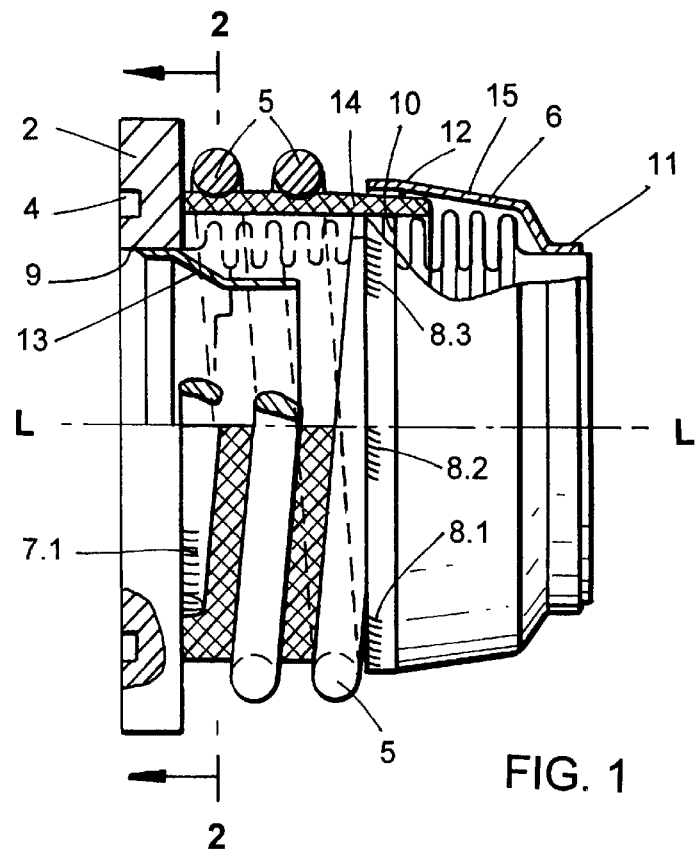
FIG. 1 shows a longitudinal section through a flexible connection arrangement according to the invention.
Figure 2:
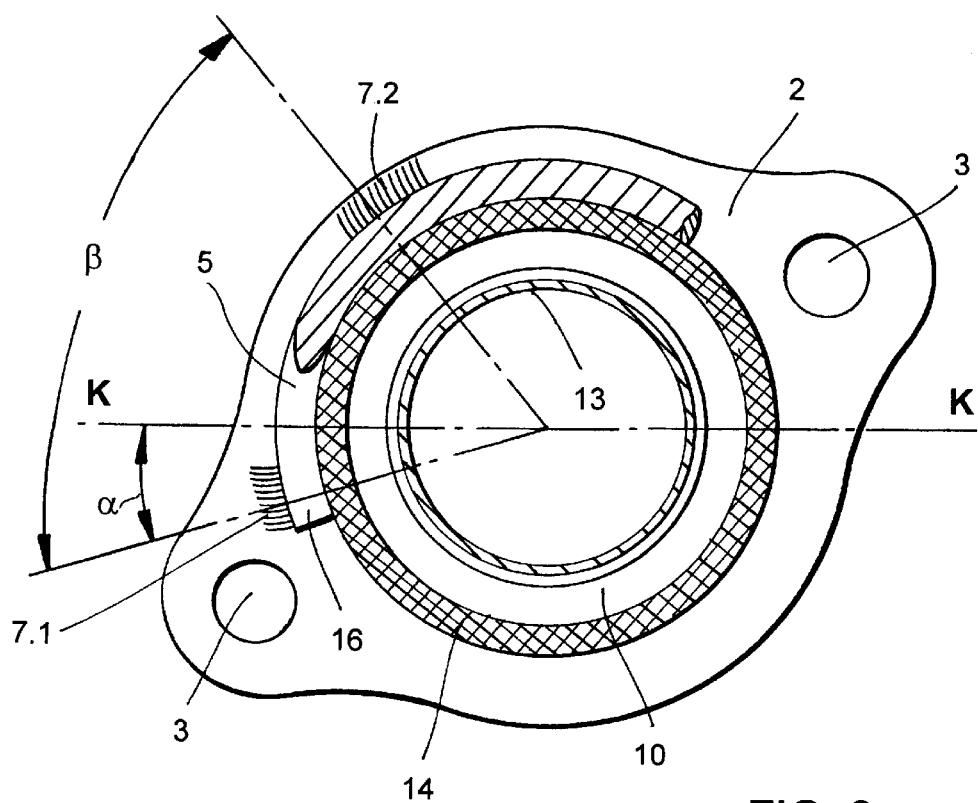
FIG. 2 shows a sectional view A—A from FIG. 1.

FIGS. 1 and 2 show a flexible connection arrangement 1 by which the end of a pipe (not shown in FIG. 1) of the exhaust line of a motor vehicle can be flexibly attached to an engine block or to an exhaust manifold (not shown in FIG. 1) or the like arranged at an engine block.

FIG. 1 shows a side view of the connection arrangement 1 in partial section and FIG. 2 shows the connection arrangement 1 in a sectional view A—A from FIG. 1.

The connection arrangement 1 has a fastening flange 2 at one axial end (at left in FIG. 1) which, as will be seen from FIG. 2, is provided with bore holes 3 through which fastening elements (e.g. screws) (not shown in the drawings) can be inserted in order to secure the fastening flange 2 to an internal combustion engine or to a part mounted thereon (e.g., an exhaust manifold). The fastening flange 2 can preferably be produced from a suitable steel, e.g., St 37.

The fastening flange 2 is provided with a circumferential groove 4 on its fastening side, a suitable seal being inserted therein prior to assembly.

Further, the fastening flange 2 is connected, via a helical spring 5, with a connection piece 6 which is arranged at the opposite axial end of the connection arrangement 1. As is shown in FIG. 1, the connection piece 6 is formed from a circumferential steel plate (e.g., with a 1.5-mm thickness) and has a cylindrical end region 11 at its end remote of the fastening flange 2. Proceeding from this cylindrical end region 11, the connection piece 6 widens in the direction of the fastening flange 2, then passes into a middle portion which widens conically in cross section, and forms a radially widening, cylindrical end region 12 at its end portion facing the fastening flange 2. The diameter of the cylindrical end region 12 is appreciably greater than that of the cylindrical end portion 11 at the opposite end of the connection piece 6.

The spring 5 is connected by its end region 16 (FIG. 2) located on the side of the fastening flange 2 with the fastening flange 2 at a first fastening location 7.1 and, viewed in the winding direction of the helical spring 5, at a second fastening location 7.2 so as to be offset by an angle $\beta=50°$ relative to the first fastening location 7.1. The fastening is effected at both fastening locations via a weld point or a very short weld seam (with a length of approximately 13 to 15 mm). At the opposite axial end, the spring 5 is connected with the outer surface of the connection piece 6 via three fastening locations 8.1, 8.2 and 8.3. These fastening locations are also formed by weld points or very short weld seams. For this purpose, as can be seen from FIGS. 1 and 2, the spring must contact the fastening flange 2 and the connection piece 6 by its respective end over a determined angular region in order to ensure these fastening points.

A central opening 9 is provided in the fastening flange 2 to let in hot exhaust gases coming from the engine. The cylindrically tapering end portion of a metallic bellows 10 projects into this central opening 9 as is shown by FIG. 1. The bellows 10 has a plurality of turns or pleats. In order to show this more clearly the upper area of FIG. 1 is shown in partial section. The pleats of the bellows 10 extend far into the connection piece 6 axially and, at that axial end, the bellows 10 again tapers into a cylindrical end portion which is received in the inner opening of the end portion 11 of the connection piece 6.

Also seated in the inlet opening 9 of the fastening flange 2, radially inside the end portion of the bellows 10 which is also received therein, is the end region of a pipe portion 13 serving to protect the bellows 10 against heat. For this purpose, as is shown in FIG. 1, the pipe portion 13 has an intermediate portion which precedes from this end region and tapers conically inward radially. The end of the pipe portion 13 passes into a cylindrical end portion which lies concentrically inside the bellows 10 and protects the bellows 10 from the heat of the exhaust gases discharged from the engine at least over a part of its axial length.

The bellows 10 is enclosed radially on its outer side by a damping insert 14 which surrounds it and contacts the turns of the bellows 10 radially externally as is shown in FIG. 1. The damping insert 14 extends from the fastening flange 2, whose lateral surface it contacts on the side facing it, axially into the widened end region 12 of the connection piece 6. A small radial gap 15 of 0.5 to 0.8 mm is formed between the outer surface of the damping insert 14 and the inner surface of the widened end portion 12 of the connection piece 6.

As is also shown in FIG. 1, the turns of the helical spring 5 contact (with pretensioning) the damping insert 14 radially externally and are also embedded slightly in the damping insert 10 on their side facing the damping insert 14. But it would also be equally possible for the turns of the helical spring 5 to contact only the outer side of the damping insert 14 accompanied by pretensioning, which possibility is not shown in FIG. 1. As a result of the geometrical design of the connection piece 6 and the presence of the radial gap 15 between the latter and the damping insert 14, it is possible for the damping insert 14 to move back and forth axially to some extent within the widened end region 12 of the connection piece 6.

The damping insert 14 is fastened neither at the fastening flange 2, which it contacts laterally, nor at the connection piece 6. Thus no compulsory stresses are built up in the damping insert 14 during the occurrence of axial relative movement between the connection piece 6 and the fastening flange 2.

In operation, as a result of the intermediary of the damping insert 14 between the turns of the bellows 12 and the turns of the helical spring 5, the damping insert 14 damps the turns of the helical spring 5 which contact the latter or are even embedded in the latter somewhat and the turns of the bellows 10. At the same time, a general damping of the relative movements between the fastening flange 2, helical spring 5, connection piece 6 and bellows 10 and accordingly of all these structural component parts relative to one another is achieved. The end regions of the bellows 10 and of the pipe portion 13 which project into the opening 9 of the fastening flange 2 are fastened circumferentially and in a gastight manner jointly with the wall of the opening 9, e.g., by suitable gluing or welding.

The turns of the helical spring 5 are formed of a spring-steel wire with a diameter of 7.5 mm and the damping insert 14 is formed of a metal wire mesh which allows air to pass through so as to prevent overheating of the bellows 10.

If the flexible connection arrangement 1 shown in FIGS. 1 and 2 is subjected to a determined deformation which, allowing for its subsequent installation position, takes place during a determined load situation for which the connection arrangement is designed (nominal load), then a tilt axis K—K, shown in dash-dot lines in FIG. 2, lying vertical to the plane of the introduction of force is determined by the introduction of force corresponding to this load situation.

As is shown in FIG. 2, the first fastening location 7.1, viewed in the winding direction of the helical spring 5, lies at an angle $\alpha$ in front of the tilt axis K—K in the sectional plane shown in FIG. 2 which extends radially and vertically with respect to the longitudinal axis L—L (FIG. 1) of the connection arrangement 1. In the embodiment example shown in the drawing, this angle $\alpha$ is 15°, while angle $\beta$ which describes the angular offset between the two fastening locations 7.1 and 7.2 is 50° in the embodiment example.

Figure 3:
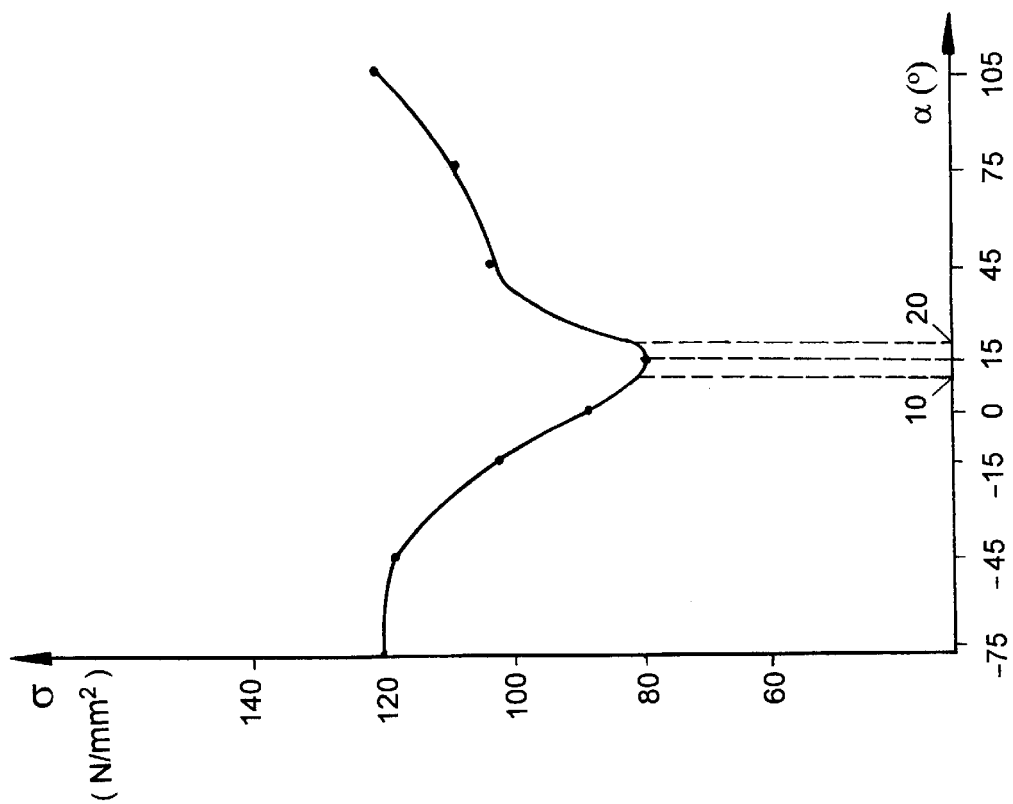
FIG. 3 is a graph showing the equivalent stress values calculated according to the von Mises method in the weld point at the second fastening location as a function of a different position of this weld point from the weld point at the first fastening location at the end of the helical spring.

FIG. 3 shows a graph of the curve of the von-Mises equivalent stress $\sigma$ of the weld point at the fastening location 7.1 which is arranged as shown in FIG. 2 at the end region 16 of the helical spring 5 at its side facing the fastening flange 2 as a function of different values of angle $\alpha$. At an angle having a value in the range of 10° to 20°, the stress diffusion shows that the values of the equivalent stress $\sigma$ (measured in N/mm²) are especially small with a minimum at a value of angle $\alpha$ of 15°

Figure 4:
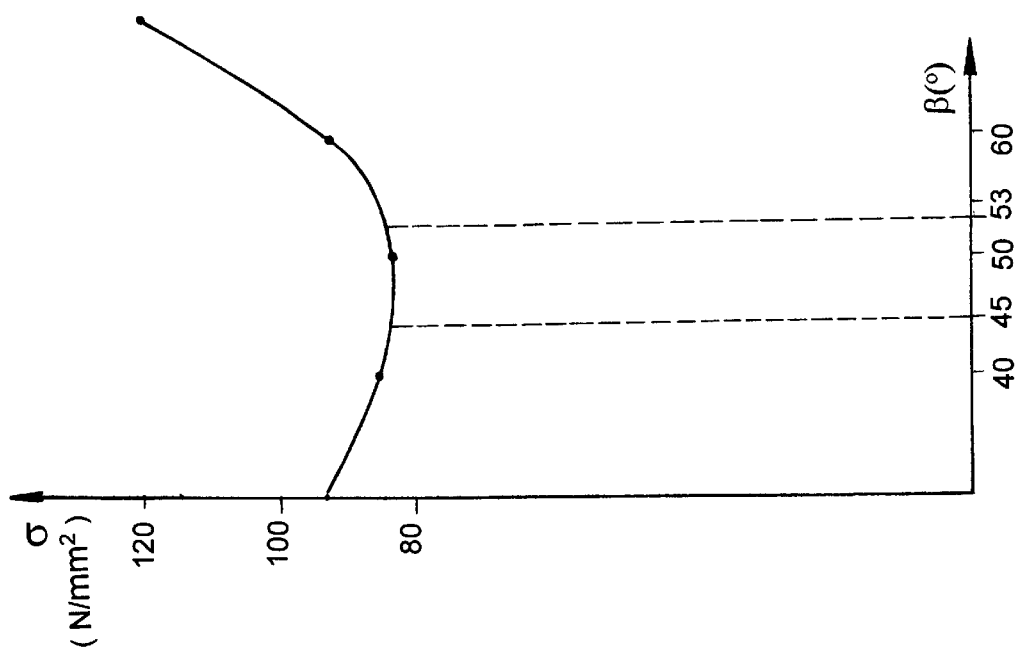
FIG. 4 is a graph showing the equivalent stress values calculated according to the von Mises method in the weld seam at the first fastening location (at the end of the helical spring) as a function of its angular position relative to the tilt axis of the overall arrangement.

FIG. 4 shows the curve of the equivalent stress $\sigma$ for the weld point of the second fastening location 7.2 as a function of its angular offset $\beta$ from the first fastening location 7.1 when the latter which again lies at the end region 16 of the helical spring 5 is located at a point corresponding to angle $\alpha=15°$, that is, at a location which gives a minimum equivalent stress in the first fastening location 7.1 from the graph in FIG. 3.

The graph in FIG. 4 shows that the values of the equivalent stress $\sigma$ when the angular offset of the second fastening location 7.2 to the first fastening location 7.1 is in the range of $\alpha=45°$ to $\alpha=53°$ are especially small. A minimum can be detected at $\beta=50°$, after which, i.e., at greater angles $\alpha$, the stress values $\sigma$ rise very markedly. The calculated values lie between $\sigma=86.7$ N/mm² in the most favorable case (at $\beta=50°$) and $\alpha=120.3$ N/mm² in the least favorable case for the embodiment example shown in the drawing.

In a corresponding manner, the angle $\alpha$ with a value of 50° was selected as the optimum position for the second fastening location 7.2 in the embodiment example shown in FIGS. 1 and 2.

While the foregoing description and drawings represent the preferred embodiments of the present invention, it will be obvious to those skilled in the art that various changes and modifications may be made therein without departing from the true spirit and scope of the present invention.

What is claimed is:

1. A flexible connection arrangement for connecting a pipe of an exhaust system to an engine, especially of an exhaust system in a motor vehicle, comprising:

a fastening flange provided at one axial end of said arrangement for fastening to the engine and a connection piece arranged at the other axial end for receiving one end of the pipe to be connected;

a helical spring for connecting said connection piece and said fastening flange with one another;

a metallic bellows being arranged between the connection piece and fastening flange radially inside the helical spring, axial ends of said bellows being connected to the fastening flange and connection piece, respectively, in a gastight manner;

a damping insert extending coaxially to said bellows and being in a working connection with said bellows, said damping insert enclosing the bellows radially externally, contacting turns of the bellows and, proceeding from the fastening flange, projecting axially into an end region of the connection piece which widens radially on the side of the connection piece facing the damping insert, the axial ends of said damping insert being connected neither to the fastening flange nor to the connection piece;

a pipe portion being connected with the fastening flange, extending coaxial to the bellows, and being arranged at a radial distance from the bellows and extending at least over a partial region of the axial extension of the bellows and serving as heat protection for the bellows;

said helical spring being connected at both axial end regions to the connection piece and to the fastening flange, respectively, and said helical spring connection with the fastening flange being effected via at least a first fastening location and a second fastening location located at a distance from the latter;

said first fastening location being arranged at the end region of the helical spring and the second fastening location being arranged so as to be offset to the first fastening location by a first angle of 45° to 53° in the winding direction of the helical spring, said first fastening location viewed in the winding direction of the helical spring lying at a second angle in the range of 10° to 20° in front of a radially extending tilt axis running perpendicular to the axial longitudinal axis of the connection arrangement;

said connection arrangement being tilted about the tilt axis during the introduction of occurring forces when used in a prescribed manner.

2. The flexible connection arrangement according to claim 1, in which the helical spring is connected with the fastening flange only via the first fastening location and second fastening location.

3. The flexible connection arrangement according to claim 1, in which the helical spring is connected with the connection piece via three fastening locations.

4. The flexible connection arrangement according to claim 1, in which all fastening locations are constructed as weld points.

5. The flexible connection arrangement according to claim 1, in which the first angle is 50°.

6. The flexible connection arrangement according to claim 1, in which the second angle is 15°.

7. The flexible connection arrangement according to claim 1, in which the damping insert is displaceable axially within the widened end region of the connection piece.

8. The flexible connection arrangement according to claim 7, in which there is a radial gap between the outer surface of the damping insert and the inner surface of the widened end region of the connection piece.

9. The flexible connection arrangement according to claim 1, in which the turns of the helical spring are partially embedded slightly in the surface of the damping insert.

10. The flexible connection arrangement according to claim 1, wherein the bellows is provided with helical or annular-wave turns.

11. The flexible connection arrangement according to claim 1, in which the damping insert is formed of a braided metal fabric.

12. The flexible connection arrangement according to claim 1, in which the damping insert is formed of a woven metal fabric.

13. The flexible connection arrangement according to claim 1, in which the damping insert is formed of a metal wire grate.

14. The flexible connection arrangement according to claim 1, in which the damping insert is formed of a metal wire mesh.

15. The flexible connection arrangement according to claim 1, in which the damping insert is formed of a compressed metal wire.

16. The flexible connection arrangement according to claim 1, in which the damping insert has an admixture of glass fibers or mineral fibers.

17. The flexible connection arrangement according to claim 1, in which the helical spring is formed of a spring-steel wire with a diameter of 7.5 mm.

18. The flexible connection arrangement according to claim 1, in which the damping insert is permeable to air in the radial direction.

* * * * *